(12) United States Patent
Berardi

(10) Patent No.: US 11,192,414 B1
(45) Date of Patent: Dec. 7, 2021

(54) SUSPENSION SYSTEM

(71) Applicant: XTravel Suspension, LLC, Rancho Santa Fe, CA (US)

(72) Inventor: Nestor Alexander Berardi, Temecula, CA (US)

(73) Assignee: XTRAVEL SUSPENSION, LLC, Rancho Santa Fe, CA (US)

( * ) Notice: Subject to any disclaimer, the term of this patent is extended or adjusted under 35 U.S.C. 154(b) by 0 days.

(21) Appl. No.: 17/144,654

(22) Filed: Jan. 8, 2021

Related U.S. Application Data

(60) Provisional application No. 63/198,361, filed on Oct. 13, 2020.

(51) Int. Cl.
*B60G 3/20* (2006.01)
*B62K 25/24* (2006.01)

(52) U.S. Cl.
CPC ............... *B60G 3/20* (2013.01); *B62K 25/24* (2013.01); *B60G 2200/44* (2013.01); *B60G 2204/143* (2013.01); *B60G 2204/416* (2013.01); *B60G 2204/422* (2013.01)

(58) Field of Classification Search
CPC ............... B60G 3/20; B60G 2204/416; B60G 2200/44; B60G 2204/422; B60G 2204/143; B62K 25/24
See application file for complete search history.

(56) References Cited

U.S. PATENT DOCUMENTS

| | | | | |
|---|---|---|---|---|
| 1,888,801 A | * | 11/1932 | Herold | B60B 33/0002 16/21 |
| 2,525,622 A | * | 10/1950 | Shafer | F16C 33/427 384/530 |
| 2,566,421 A | * | 9/1951 | Lapointe | F16C 19/10 384/526 |
| 2,715,712 A | * | 8/1955 | Pulsford | G01R 23/00 324/76.67 |
| 2,776,721 A | * | 1/1957 | Giacosa | B60K 5/10 180/12 |
| 2,779,642 A | * | 1/1957 | Matthews | A47B 11/00 384/615 |
| 2,921,450 A | * | 1/1960 | Klomp | F16D 3/38 464/132 |
| 4,611,681 A | | 9/1986 | Krude et al. | |
| 4,705,292 A | * | 11/1987 | Hespelt | B60G 3/26 280/124.139 |
| 4,708,361 A | | 11/1987 | Takada et al. | |

(Continued)

FOREIGN PATENT DOCUMENTS

CN 109017183 A 12/2018
CN 109664702 A 4/2019
(Continued)

*Primary Examiner* — Darlene P Condra
(74) *Attorney, Agent, or Firm* — Umberg Zipser LLP

(57) ABSTRACT

Multi-link suspension systems for vehicle are described having various linkage arms that connect to distinct points of a wheel mount. Each of the linkage arms are preferably coupled to the wheel mount via a spherical ball joint and mounted such that they can independently move with respect to the other linkage arms. A shock assembly is preferably mounted between two of the linkage arms on a separate links that is configured to vary its length based on movement of one or both of the two linkage arms.

22 Claims, 10 Drawing Sheets

(56) References Cited

U.S. PATENT DOCUMENTS

| | | |
|---|---|---|
| 4,714,270 A | 12/1987 | Rumpel |
| 4,723,791 A | 2/1988 | Miura et al. |
| 4,819,959 A | 4/1989 | Inoue et al. |
| 4,863,188 A | 9/1989 | Killian |
| 5,284,353 A | 2/1994 | Shinji et al. |
| 5,415,427 A * | 5/1995 | Sommerer ............... B60G 3/20 280/124.135 |
| 5,421,606 A | 6/1995 | Chun |
| 5,507,510 A | 4/1996 | Kami et al. |
| 6,547,027 B1 | 4/2003 | Kalhok et al. |
| 6,767,022 B1 | 7/2004 | Chevalier |
| 6,783,136 B2 * | 8/2004 | Pronsias Timoney ....................... F16C 11/0695 280/124.136 |
| 6,945,547 B2 | 9/2005 | Ackley et al. |
| 7,004,484 B1 | 2/2006 | Chevalier |
| 7,048,286 B2 | 5/2006 | Eppelein |
| 7,258,355 B2 | 8/2007 | Amano |
| 7,343,997 B1 | 3/2008 | Matthies |
| 7,441,788 B2 | 10/2008 | Leclair |
| 7,591,337 B2 | 9/2009 | Suhre et al. |
| 7,744,104 B2 | 6/2010 | Kuwabara et al. |
| 7,845,452 B2 | 12/2010 | Bennett et al. |
| 7,891,684 B1 | 2/2011 | Luttinen et al. |
| 7,950,486 B2 | 5/2011 | Bronkhorst et al. |
| 7,954,835 B2 | 6/2011 | Nakamura et al. |
| 7,963,538 B2 | 6/2011 | Roland et al. |
| 8,079,602 B2 * | 12/2011 | Kinsman ............... B62D 21/14 280/5.512 |
| 8,444,160 B2 | 5/2013 | Okamoto et al. |
| 8,646,787 B2 | 2/2014 | Langhoff et al. |
| 8,944,449 B2 | 2/2015 | Hurd et al. |
| 9,216,625 B2 | 12/2015 | Ruiz |
| 9,238,394 B2 | 1/2016 | Leibl |
| 9,434,230 B2 | 9/2016 | Schmitt et al. |
| 9,469,174 B2 | 10/2016 | Mohrlock et al. |
| 9,561,818 B2 | 2/2017 | Uchihara |
| 9,586,613 B2 | 3/2017 | Shinbori et al. |
| 9,884,647 B2 | 2/2018 | Peterson et al. |
| 9,944,142 B2 | 4/2018 | Mohrlock |
| 9,981,519 B2 * | 5/2018 | Despres-Nadeau ...... B60G 3/20 |
| 10,315,696 B2 | 6/2019 | Gordon |
| 10,343,742 B2 | 7/2019 | Zawistowski |
| 10,350,955 B2 | 7/2019 | Langhoff et al. |
| 10,399,401 B2 | 9/2019 | Schlangen et al. |
| 10,442,263 B2 | 10/2019 | Gordon |
| 10,457,140 B2 | 10/2019 | Bennett et al. |
| 10,525,781 B2 | 1/2020 | Upah et al. |
| 10,532,772 B2 | 1/2020 | Upah et al. |
| 10,800,224 B2 | 10/2020 | Sellars et al. |
| 10,821,794 B2 | 11/2020 | Nakashima et al. |
| 2004/0140641 A1* | 7/2004 | Eppelein ................ B60G 3/26 280/124.135 |
| 2005/0072613 A1 | 4/2005 | Maltais et al. |
| 2005/0275183 A1* | 12/2005 | Amano ................ B60G 3/20 280/124.128 |
| 2007/0074925 A1 | 4/2007 | Seki et al. |
| 2010/0264616 A1* | 10/2010 | Gell .................. B60G 3/20 280/124.135 |
| 2011/0309600 A1* | 12/2011 | Allsop .................... B60D 1/52 280/511 |
| 2012/0043736 A1* | 2/2012 | Okamoto .............. B60G 3/20 280/124.135 |
| 2018/0281540 A1* | 10/2018 | Gordon ................ B62D 7/16 |
| 2018/0281853 A1 | 10/2018 | Gordon |
| 2019/0001782 A1 | 1/2019 | Anderson et al. |
| 2019/0009632 A1* | 1/2019 | Holt ...................... B60G 11/50 |
| 2019/0134520 A1* | 5/2019 | Egli .................... A63H 17/262 |
| 2019/0225041 A1 | 7/2019 | Upah et al. |
| 2019/0256136 A1 | 8/2019 | Gordon |
| 2019/0299737 A1 | 10/2019 | Sellars et al. |
| 2019/0381847 A1 | 12/2019 | Kumagai et al. |
| 2020/0148019 A1 | 5/2020 | McConville et al. |
| 2020/0148264 A1 | 5/2020 | Daikoku et al. |
| 2020/0189341 A1 | 6/2020 | Shin et al. |

FOREIGN PATENT DOCUMENTS

| | | |
|---|---|---|
| CN | 109677221 A | 4/2019 |
| CN | 208962797 U | 6/2019 |
| DE | 7027784 U | 1/1972 |
| DE | 1938850 C3 | 6/1981 |
| DE | 102010030292 A1 | 12/2011 |
| DE | 102016212662 A1 | 1/2018 |
| DE | 102017219778 A1 | 5/2019 |
| EP | 1958797 A1 | 8/2008 |
| EP | 3356176 B1 | 4/2020 |
| JP | 2823854 B2 | 11/1998 |
| WO | 2017120509 A1 | 7/2017 |
| WO | 2017191023 A1 | 11/2017 |
| WO | 2019078120 A1 | 4/2019 |
| WO | 2019204717 A1 | 10/2019 |

* cited by examiner

SUSPENSION SYSTEM

This application claims priority to U.S. provisional patent application having Ser. No. 63/198,361 filed on Oct. 13, 2020. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is suspension systems for vehicles.

BACKGROUND

The following description includes information that may be useful in understanding the present invention. It is not an admission that any of the information provided herein is prior art or relevant to the presently claimed invention, or that any publication specifically or implicitly referenced is prior art.

Typical suspension designs for vehicles are designed around creating an offset axis point on the center of the tire mass and lining up to one axis point at the bottom of the tire contact patch. This causes the suspension arm under vehicle load to be static, not dynamic.

To the inventor's knowledge, there are currently no suspension systems that allow spring and shock control to a moving or virtual pivot shared between two or more separate links while also including a multiple link control to the spindle to create a virtual pivot.

Suspension systems exist having a three-point pivoting control arm on the top and bottom of a spindle upright or knuckle. However, such systems typically have wheel and tire packaging issues when trying to reach the correct tire axis geometry.

While the "V-type" suspension geometry provides the correct tire axis point by moving the single outer pivot into two separate pivots that geometrically converge on to one axis point, vehicles with such systems typically do not share the load of the shock or spring with more than one link point. Instead, such vehicles use a single link or the spindle/knuckle to mount the shock and/or spring.

Generally, where multi-link suspension systems have been used, vehicles having such systems require very little travel or movement within the suspension system, in contrast to off-road vehicles that require large amounts of travel within the suspension system. Shocks in off-road vehicles are also understandably larger than shocks on vehicles used for road racing, and generally have been mounted to the spindle or a single suspension link. However, such configurations likely will not provide sufficient strength for the shock and will fail over time.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for a multi-link suspension system for a vehicle providing sufficient support for a shock assembly while also allowing for individual pivoting or movement of each of the links in the system.

SUMMARY OF THE INVENTION

The inventive subject matter provides apparatus, systems and methods for suspension systems for vehicles. Such vehicles could include, for examples, automobiles, trucks, all-terrain vehicles, snowmobiles and any other vehicle that requires an accurate level of control and function.

The inventive subject matter described herein provides a novel solution to the inherent problems with suspension designs of the prior art. It drastically reduces feedback to the driver in rough terrain without the aid of a stabilizer or dampener. It also allows a novel way to mount shocks to change handling dynamics under rough terrain. The novel suspension systems described herein create additional pivot points within the suspension by attaching the shock to the system that sits between either the upper two linkage arms or the lower two linkage arms.

Preferred suspension systems comprise a plurality of linkage arms that couple a chassis of the vehicle to a wheel mount. Each of the linkage arms attaches to the wheel mount at a distinct point, meaning that each of the linkage arms attaches to the wheel mount of distinct and separate locations from the others. It is also preferred that each of the linkage arms attaches to the vehicle's chassis at a distinct point.

It is contemplated that each of the linkage arms couples to the wheel mount via a spherical ball joint, such that each of the linkage arms can move or pivot independently of the other linkage arms. In preferred embodiments, at least some of the linkage arms are secured to the spherical ball joint via first and second fasteners disposed on opposite sides of the spherical ball joint. While bolts are preferred, any commercially suitable fasteners could be used that are configured to withstand the forces and stresses encountered when the vehicle is driven.

By utilizing two fasteners to secure the linkage arms to the spherical ball joint, this advantageously creates a double shear joint, which distributes the shear forces encountered by the joint leading to less likelihood that the joint and fasteners will fail.

In some contemplated embodiments, it is contemplated that four linkage arms could be used to couple the wheel mount with the chassis. In such embodiments, it is preferred that each of the linkage arms are mounted at distinct points to the wheel mount and chassis, and are mounted to allow each of the linkage arms to move or pivot independently of the other linkage arms. It is further contemplated that a fifth linkage arm could be used to connect the steering column to the wheel mount to thereby allow for steering of the vehicle. The fifth linkage arm is also preferably mounted to the wheel mount at a distinct location and independently of the other four linkage arms.

It is especially preferred that the suspension system further comprises a suspension linkage arm connected to two of the linkage arms described above, preferably either the lower two linkage arms (front and back) or the upper linkage arms (front and back). In this manner, the suspension linkage arm can be disposed between the two linkage arms. A shock assembly can be connected to the suspension linkage arm at a first end.

It is contemplated that the suspension linkage arm can be configured such that the suspension linkage arm can vary in length as the vehicle moves causing movement of one or more of the linkage arms.

The shock assembly is therefore able to move with the linkage arms in order to not interrupt the positive and negative pressure within the multi-link suspension system. The suspension linkage arm is able to put the shock assembly at the optimal angle as the vehicle's suspension system is engaged. The suspension linkage arm is able to distribute the force absorbed through the shock assembly through the two linkage arms for strength, while not interrupting the multi-link suspension system.

By utilizing the above-described suspension system, the individualized movement of each of the linkage arms advantageously works to reduce and preferably eliminate any feedback received by the steering column such as when a wheel mounted to the wheel mount encounters an obstacle such as a rock. In prior art suspension systems, the driver of the vehicle would likely feel when the vehicle hits the obstacle due to sudden rotation of the steering wheel or handlebar. However, the above-described suspension system allows for such feedback to be substantially reduced and possibly eliminated such that the steering wheel or handlebar does not rotate or rotates insignificantly when an obstacle is struck by the wheel.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
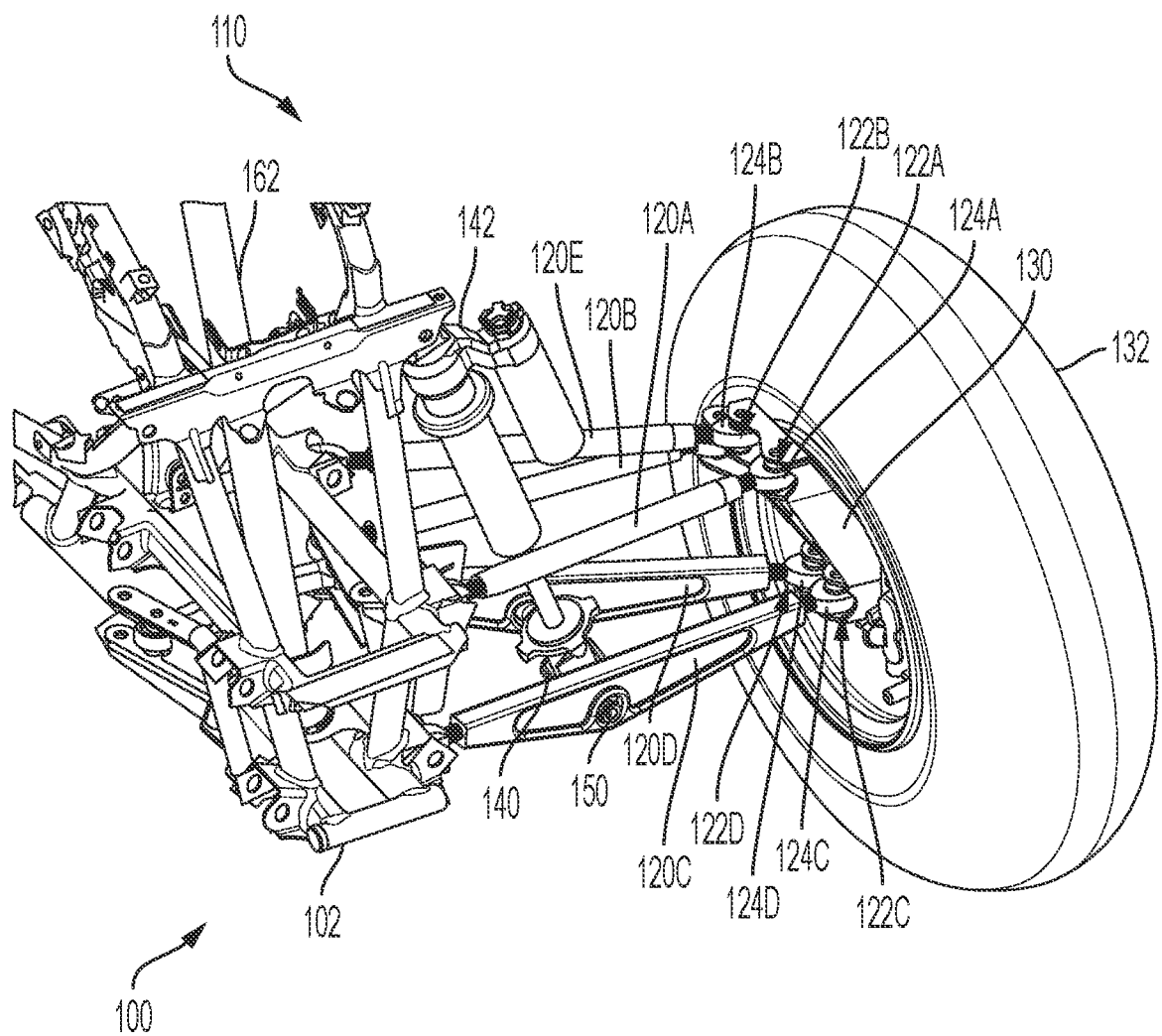
FIGS. 1-4 illustrate one embodiment of a suspension system for a vehicle.
Figure 2:
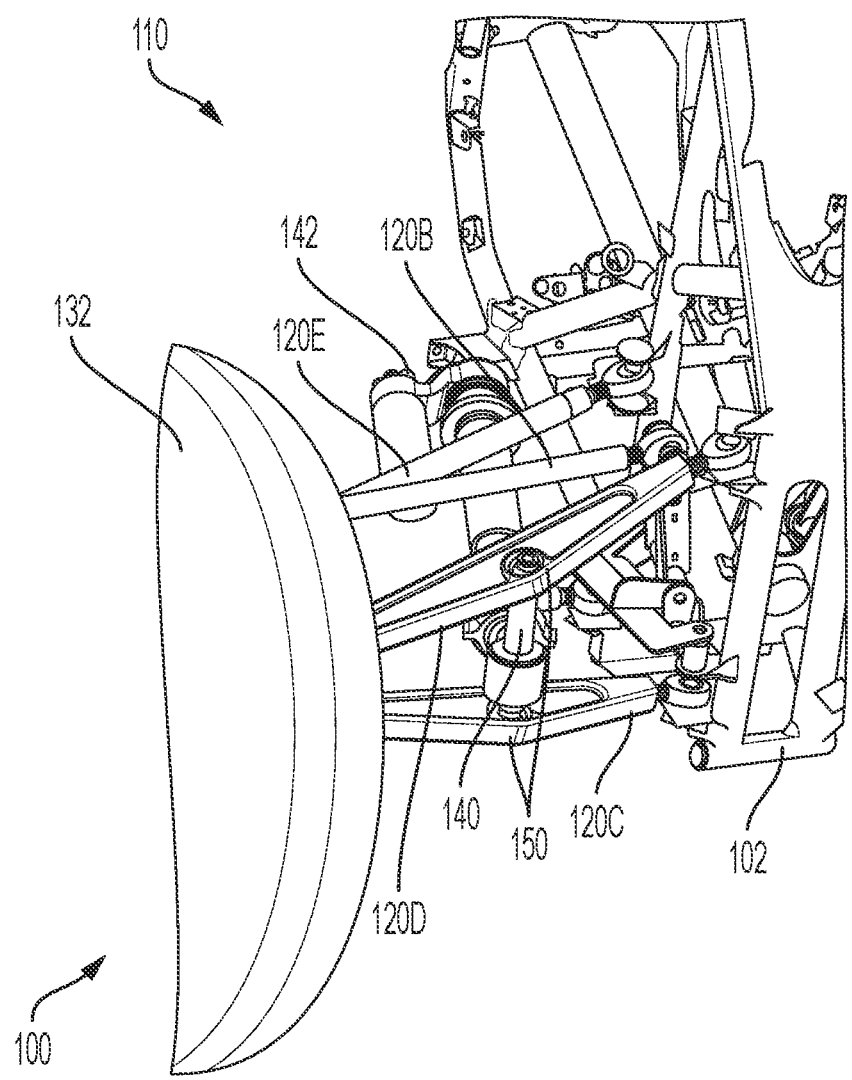
Figure 3:
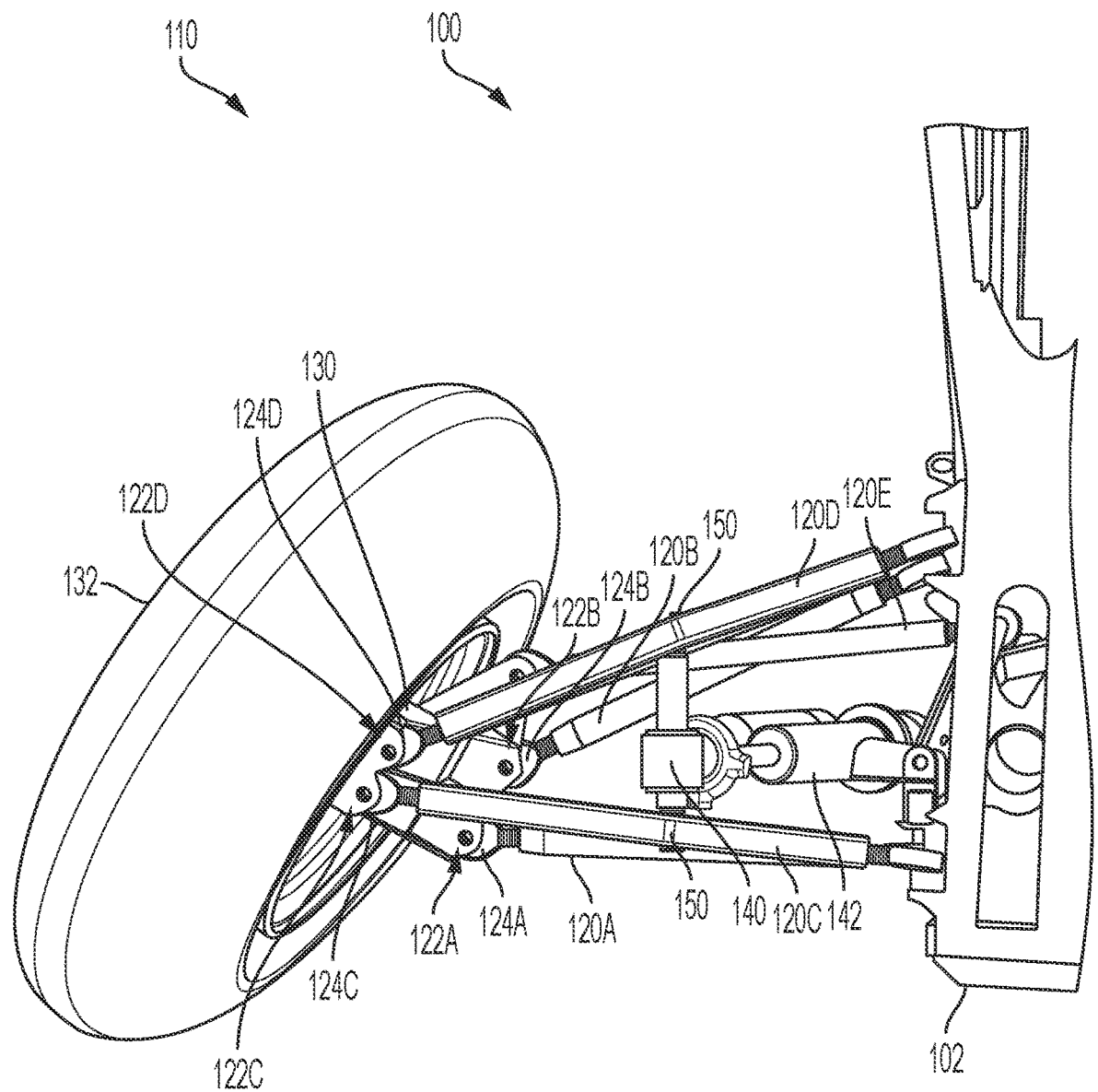
Figure 4:
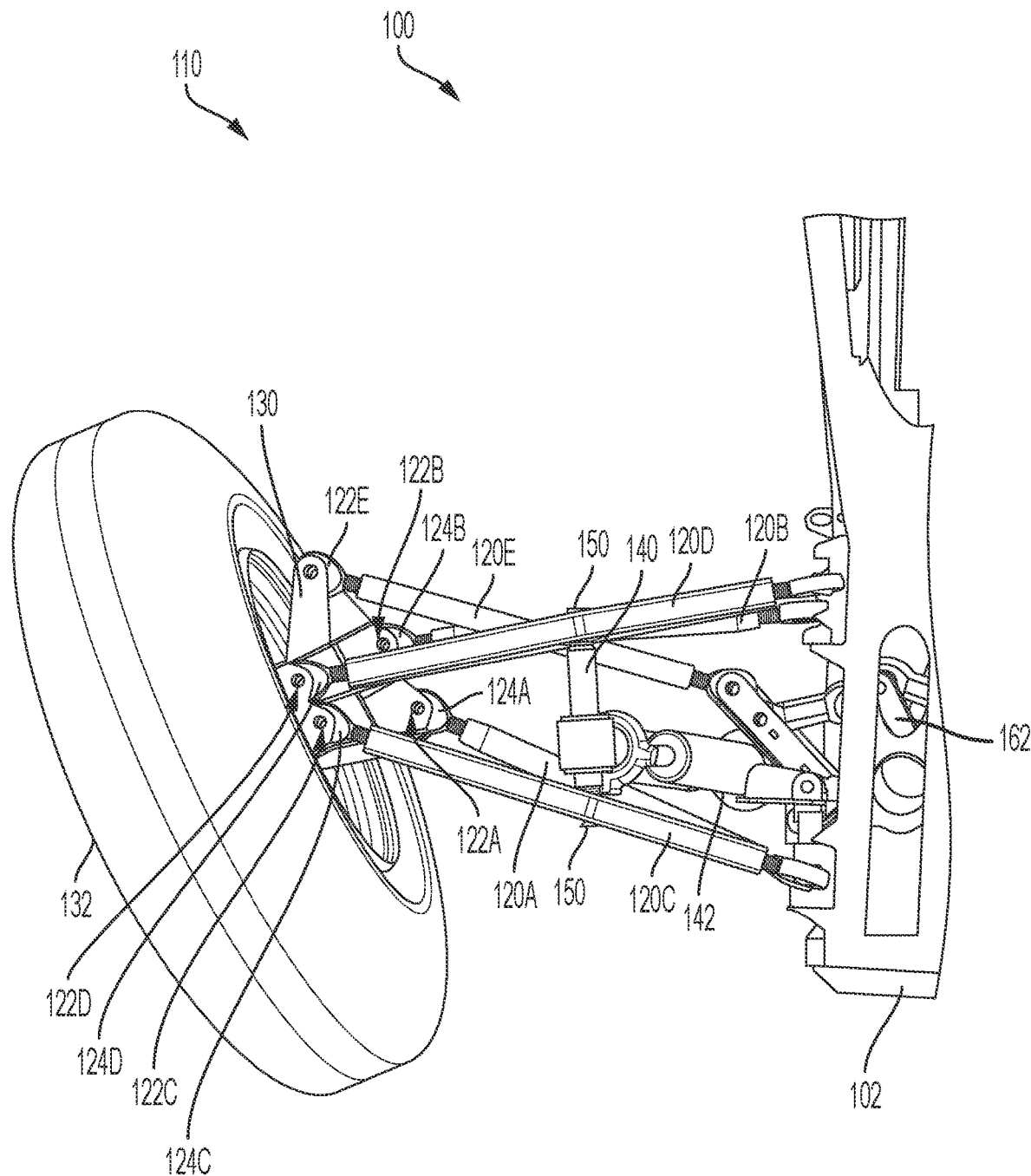
Figure 5:
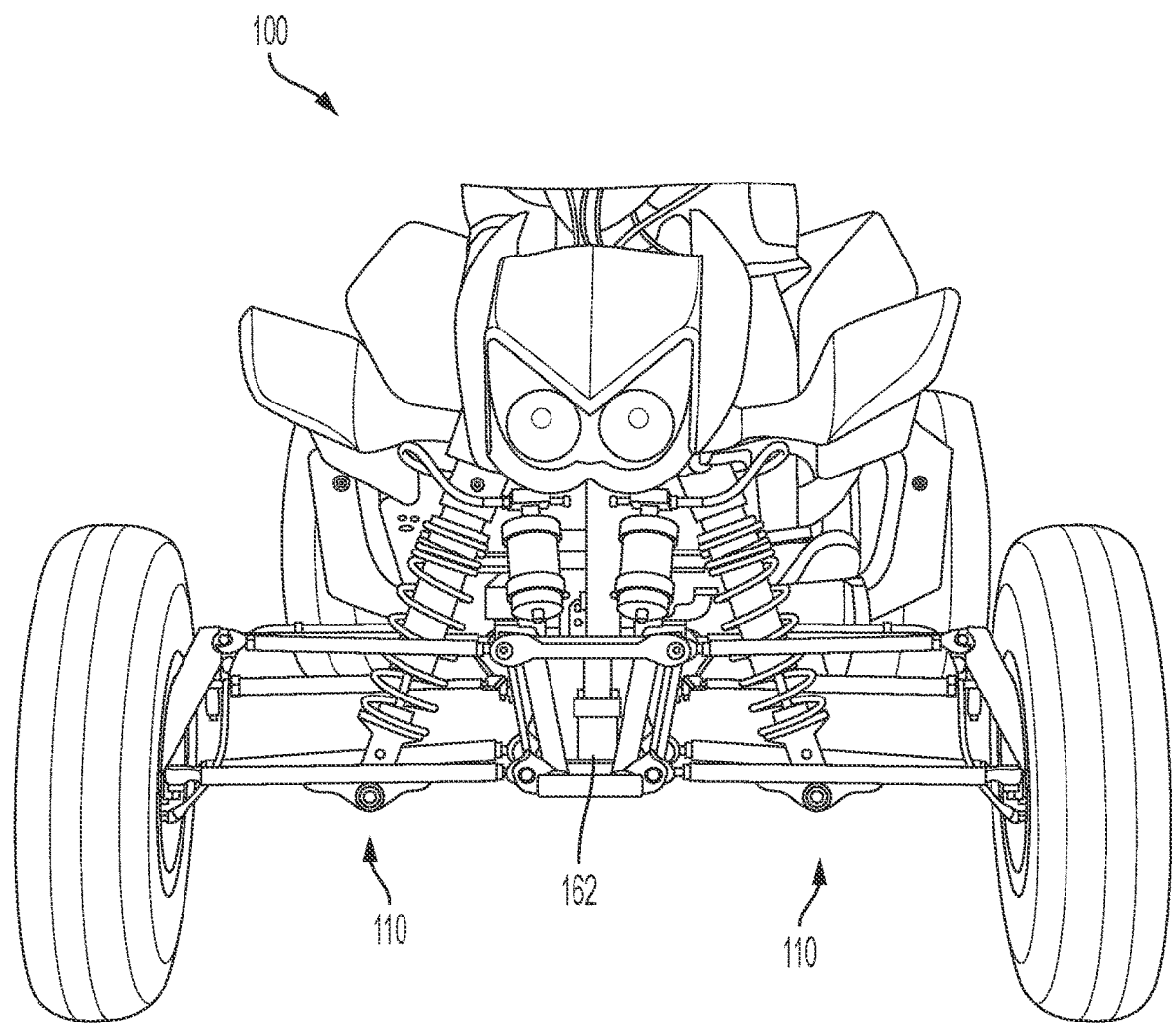
FIG. 5 illustrates one embodiment of an off-road vehicle having the suspension system on either side of the front of the vehicle.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

FIGS. 1-4 illustrates a suspension system 110 for a vehicle 100. Although vehicle 100 depicts an all-terrain vehicle, it is contemplated that the vehicle could comprise an automobile, truck, snowmobile or any other vehicle that requires an accurate level of control and function.

The suspension system 110 comprises a first linkage arm 120A that couples to a first point 122A on an upper portion of a wheel mount 130 at a first end and a chassis 102 of the vehicle 100 at a second end. As shown, the wheel mount 130 connects to a wheel 132. The suspension system 110 also comprises a second linkage arm 120B that couples to a second point 122B on the upper portion of the wheel mount 130 at a first end independent of the first linkage arm 120A, and that couples to the chassis 102 of the vehicle 100 at a second end independent of the first linkage arm 120A. As shown, the first point 122A and the second point 122B are distinct from one another.

The suspension system 110 further comprises a third linkage arm 120C and a fourth linkage arm 120D. The third linkage arm 120C couples to a third point 122C on a lower portion of the wheel mount 130 at a first end and the chassis 102 of the vehicle 100 at a second end. The fourth linkage arm 120D couples to a fourth point 122D on the lower portion of the wheel mount 130 at a first end and the chassis 102 of the vehicle 100 at a second end. As shown, the first point 122A, the second point 122B, the third point 122C and the fourth point 122D are distinct from one another, unlike the V-type suspension systems of the prior art where two or more linkage arms connect to the wheel mount at a single point.

Preferably, each of the linkage arms 120A-120D couple to the wheel mount via a spherical ball joint. The first end of the first linkage arm 120A couples to the first point 122A on the upper portion of the wheel mount 130 via a first spherical ball joint 124A. The first end of the second linkage arm 120B couples to the second point 122B on the upper portion of the wheel mount 130 via a second spherical ball joint 124B. The first end of the third linkage arm 120C couples to the third point 122C on the lower portion of the wheel mount 130 via a third spherical ball joint 124C, and the first end of the fourth linkage arm 120D couples to the fourth point 122D on the lower portion of a wheel mount 130 via a fourth spherical ball joint 124D.

Each of the linkage arms 120A-120D is preferably secured to its respective spherical ball joint 124A-124D via one or more bolts or other commercially suitable fasteners. It is especially preferred that at least two of the linkage arms are secured to their respective spherical ball joint via two fasteners, where each fastener is disposed on an opposite side of the spherical ball joint.

Thus, for example, in some embodiments, the first spherical ball joint 124A and the first end of the first linkage arm 120A can be secured to one another via first and second fasteners, with the first and second fasteners disposed on opposite sides of the first spherical ball joint 124A. Similarly, the second spherical ball joint 124B and the first end of the second linkage arm 120B are secured to one another via third and fourth fasteners, with the third and fourth fasteners disposed on opposite sides of the second spherical ball joint 124B.

In other embodiments, it is contemplated that the third spherical ball joint 124C and the first end of the third linkage arm 120C are secured to one another via fifth and sixth fasteners, with the fifth and sixth fasteners disposed on opposite sides of the third spherical ball joint 124C, and the fourth spherical ball joint 124D and the first end of the fourth linkage arm 120D are secured to one another via seventh and eighth fasteners, with the seventh and eighth fasteners disposed on opposite sides of the fourth spherical ball joint 124D.

As can be seen from the Figures, the first linkage arm 120A and the third linkage arm 120C connects a front portion of the wheel mount 130 to the chassis 102 of the vehicle 100. The second linkage arm 120B and the fourth linkage arm 120D connects a rear portion of the wheel mount 130 to the chassis 102 of the vehicle 100. Each of the first, second, third and fourth linkage arms 120A-120D are connected to the wheel mount 130 independent of one another and move and pivot independently of one another. In addition, each of the first, second, third and fourth linkage arms comprises a load-bearing arm to allow forces encountered by the wheel and wheel mount to be distributed among the linkage arms.

As shown in FIG. 1, a suspension linkage arm 140 is preferably connected to and disposed between two of the linkage arms, here the third linkage arm 120C and the fourth linkage arm 120D. Although shown disposed between the third linkage arm 120C and the fourth linkage arm 120D, it is contemplated that the suspension linkage arm 140 could alternatively be disposed between the first linkage arm 120A and the second linkage arm 120B.

Each of the third linkage arm 120C and the fourth linkage arm 120D preferably comprises a gusset 150 having an aperture configured to receive a bolt or other commercially suitable fastener. While FIGS. 1-7 show the gusset 150 mounted to a lower portion of each of the third linkage arm 120C and the fourth linkage arm 120D, it is contemplated that the gusset could alternatively be mounted to (i) an upper portion of both of the third linkage arm 120C and the fourth linkage arm 120D, (ii) a lower portion of the third linkage arm 120C and an upper portion of the fourth linkage arm 120D, or (iii) an upper portion of the third linkage arm 120C and a lower portion of the fourth linkage arm 120D.

Figure 6:
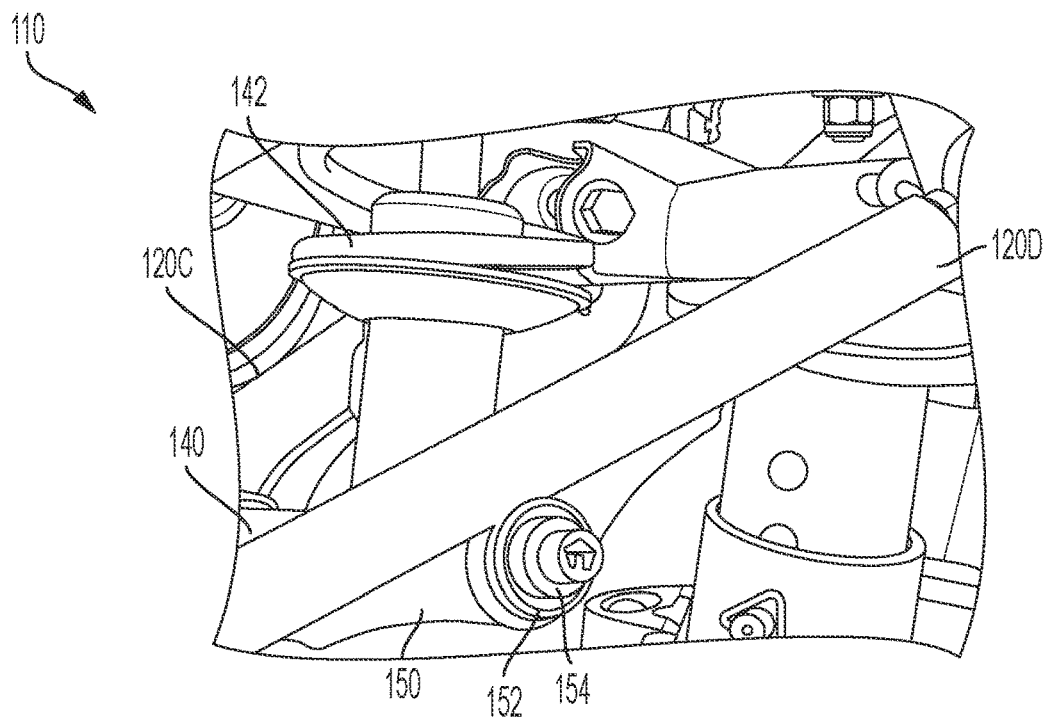
FIGS. 6-7 illustrate an enlarged view of one embodiment of a suspension linkage arm and shock assembly.

The aperture 152 is surrounded by a set of ball bearings 154 (see FIG. 6). Each end of the suspension linkage arm 140 abuts one of the apertures 152. The third linkage arm 120C and the fourth linkage arm 120D are preferably connected with a bolt, which extends through each of the holes of the gusset 150, the suspension linkage arm 140 and the basket 160 (and through the shock assembly 142 within the basket 160).

Figure 7:
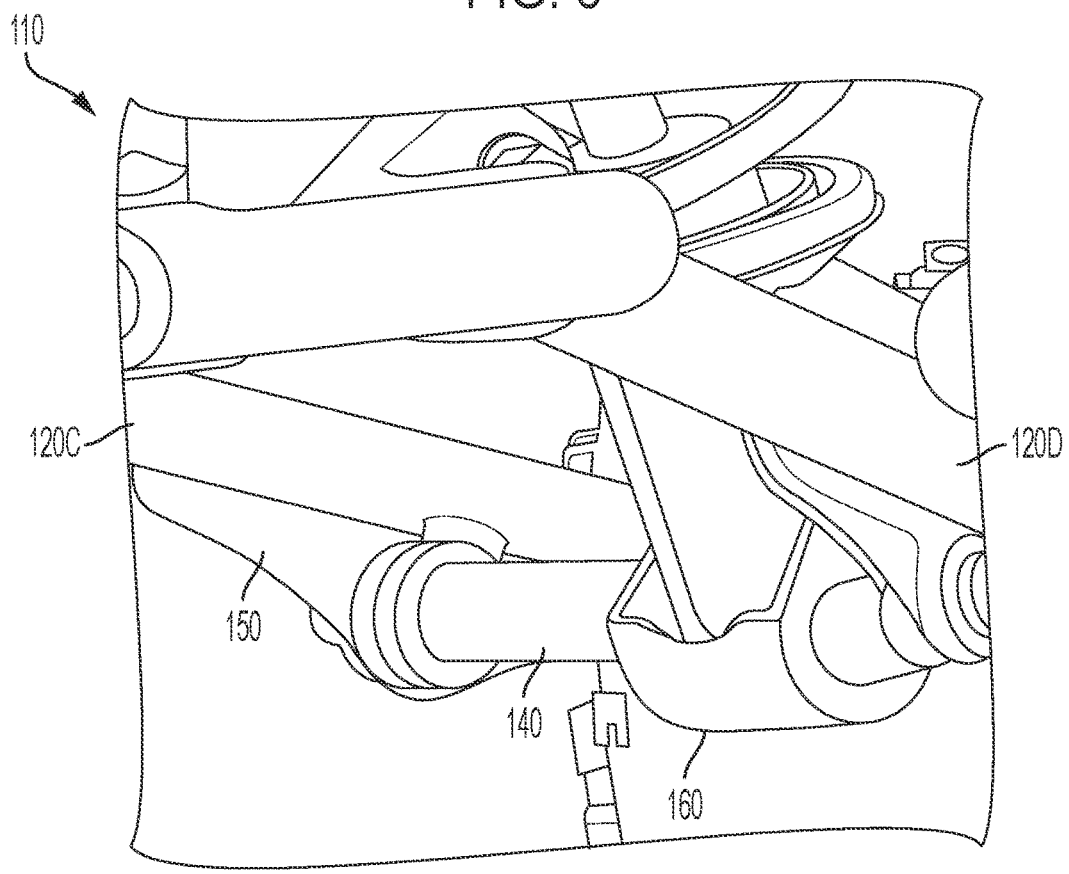

A shock assembly 142 is connected at a first end to the suspension linkage arm 140. As shown in FIG. 7, in some embodiments, the suspension linkage arm 140 further comprises a basket 160 that receives the shock assembly 142.

Preferably, the suspension linkage arm 140 is configured to increase or decrease its length in response to a movement of one or both of the third linkage arm 120C and the fourth linkage arm 120D. In this manner, it is contemplated that the suspension linkage arm 140 could comprise telescoping cylinders or have another configuration permitting it to vary in length in response to movement of one or both of the linkage arms.

By mounting the shock assembly 142 on the suspension linkage arm 140, the suspension linkage arm 140 can distribute forces absorbed through the shock assembly through the two linkage arms 120C, 120D for strength, while not interrupting the balanced state between negative and positive pressure among the linkage arms, which is required in order to eliminate the feedback to the handlebar or steering wheel.

Although shown that the suspension linkage arm 140 is mounted to or lower surface of each of the third linkage arm 120C and the fourth linkage arm 120D, it is contemplated that the suspension linkage arm 140 could alternatively be mounted to an upper surface of each of the third linkage arm 120C and the fourth linkage arm 120D.

As can be seen in FIGS. 1-4, the suspension linkage arm 140 is preferably mounted to each of the third linkage arm 120C and the fourth linkage arm 120D, such that the suspension linkage arm 140 is non-orthogonal or off-normal relative to each of the third linkage arm 120C and the fourth linkage arm 120D. In other words, the angle as measured between the suspension linkage arm 140 and either of the third linkage arm 120C and the fourth linkage arm 120D is not equal to ninety degrees.

Figure 11:
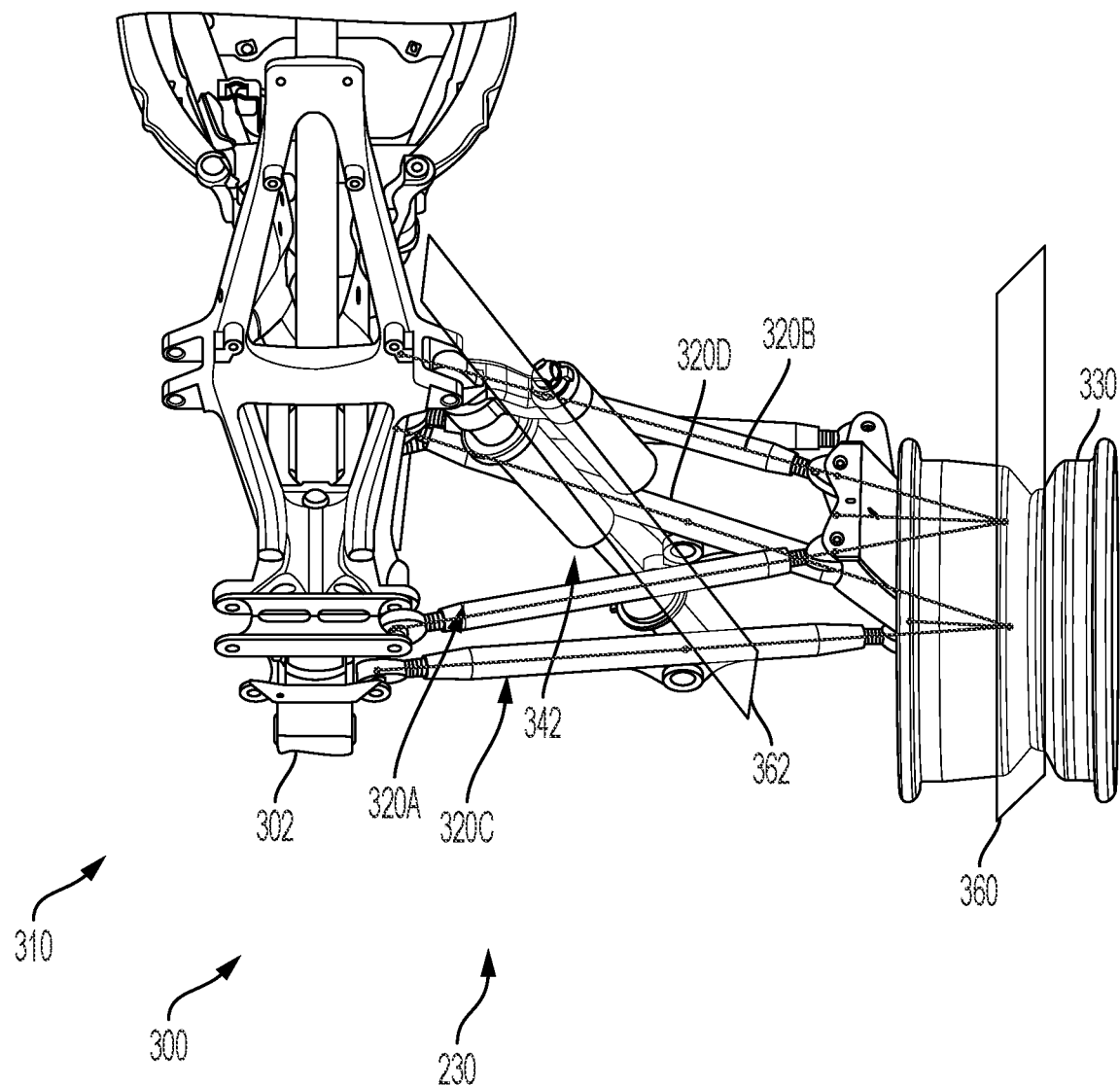
FIG. 11 illustrates another embodiment of a suspension system for a vehicle.

It is further contemplated that a first plane can vertically bisect each of the first, second, third and fourth points 122A-122D where each of the first, second, third and fourth linkage arms 120A-120D couple to the wheel mount 130, respectively. A second plane can vertically bisect the shock assembly 142. Preferably, the second plane is not parallel to the first plane. An example of this is shown in FIG. 11.

To allow steering of the vehicle 100, the suspension system 110 comprises a fifth linkage arm 120E that couples to a fifth point 122E of the wheel mount 130 at a first end and the steering rack 162 of the vehicle 100 at a second end.

Although only one side of the suspension system 110 is shown in FIGS. 1-4, FIG. 5 illustrates vehicle 100 having a suspension system 110 on the front-left and front-right sides of the vehicle 100. So, in the above example, each of the left and right sides has a suspension system 110 as described above with the four linkage arms that individually couple to a wheel mount. A shock assembly can also be coupled to two of the linkage arms on each side of the vehicle 100, such as in the manner described above.

Figure 8:
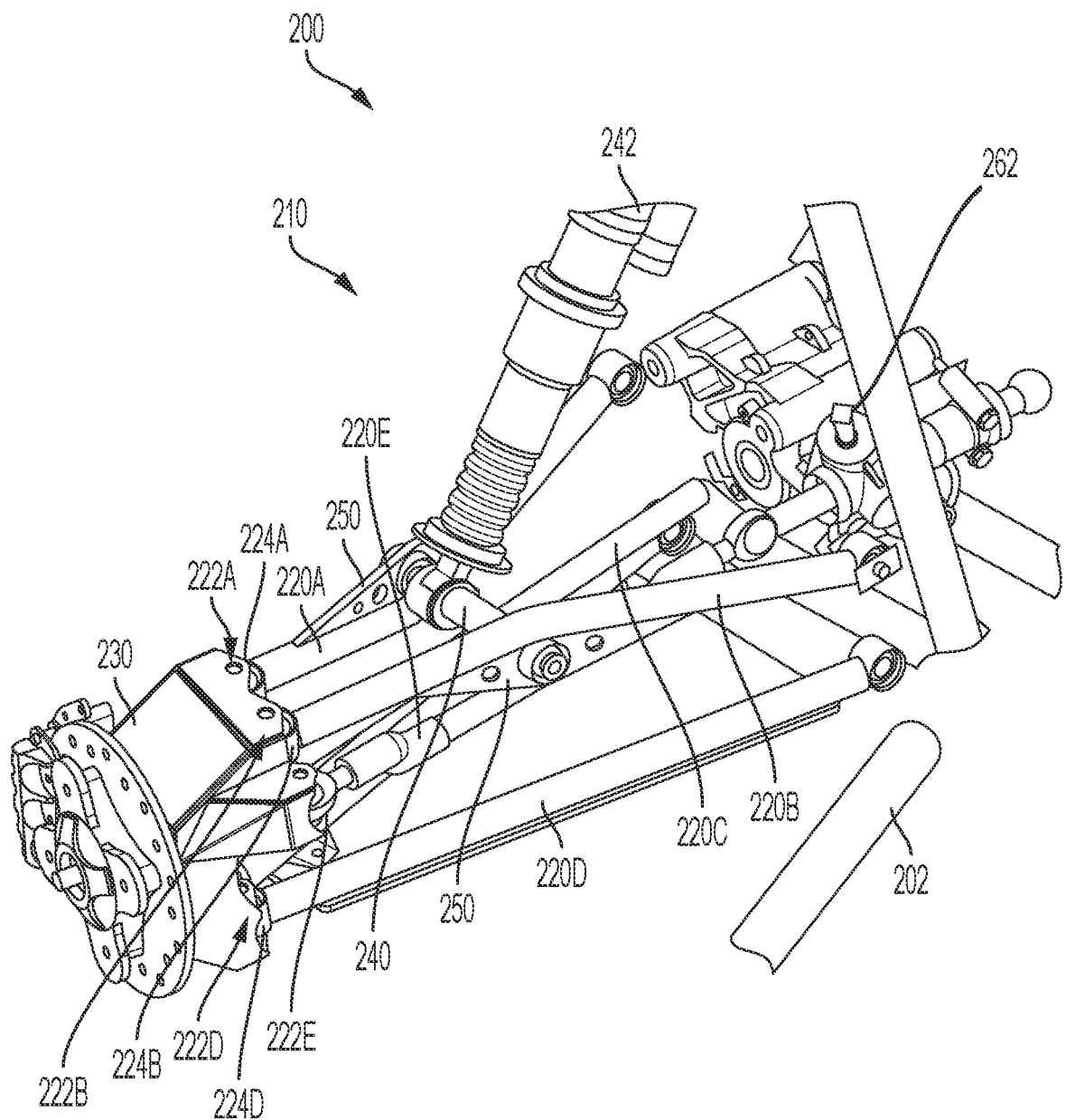
FIG. 8 illustrates another embodiment of a suspension system for a vehicle.
Figure 9:
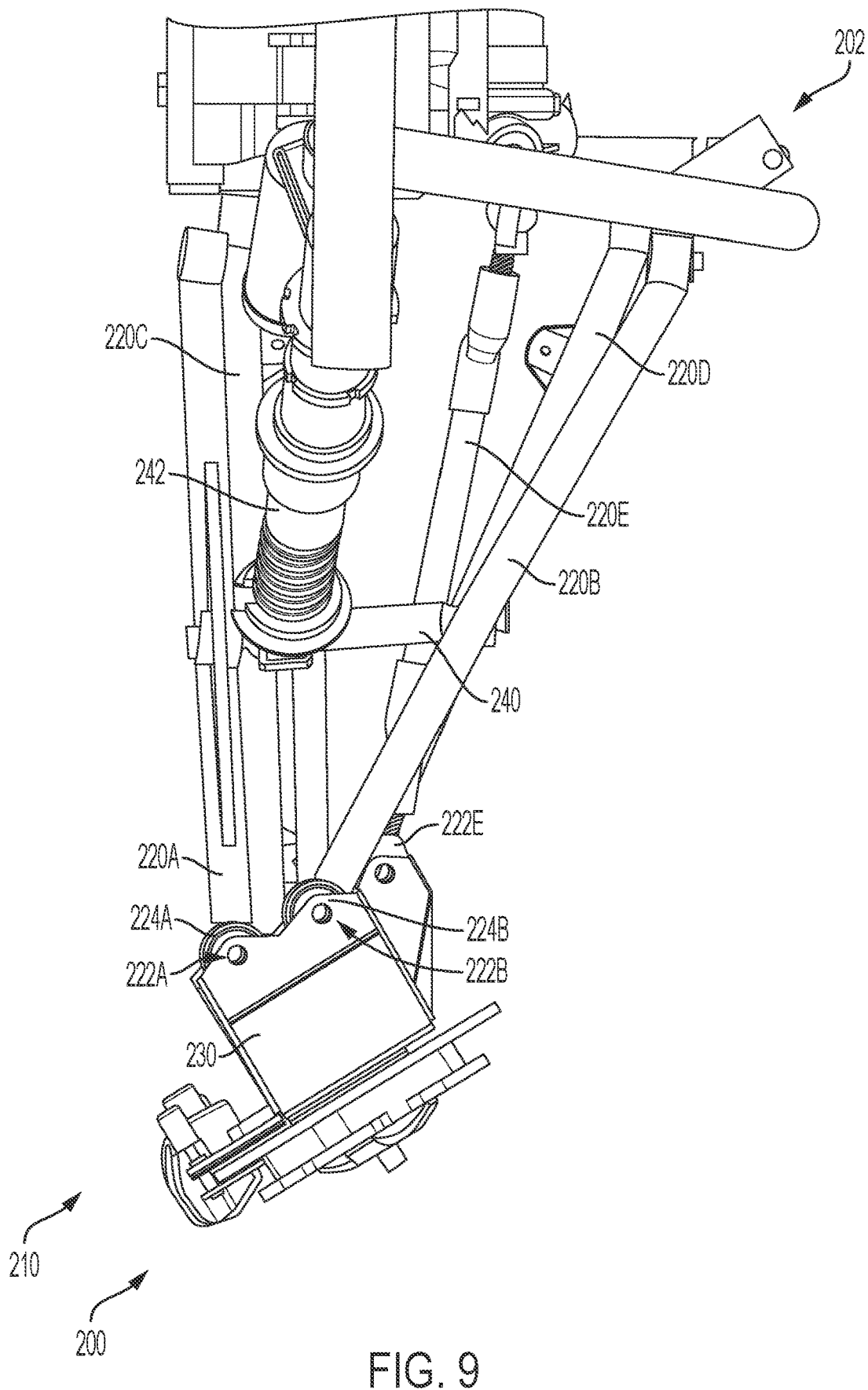
FIGS. 9-10 illustrate top views of the suspension system of FIG. 8 showing movement of the wheel mount and respective movement of the linkage arms.
Figure 10:
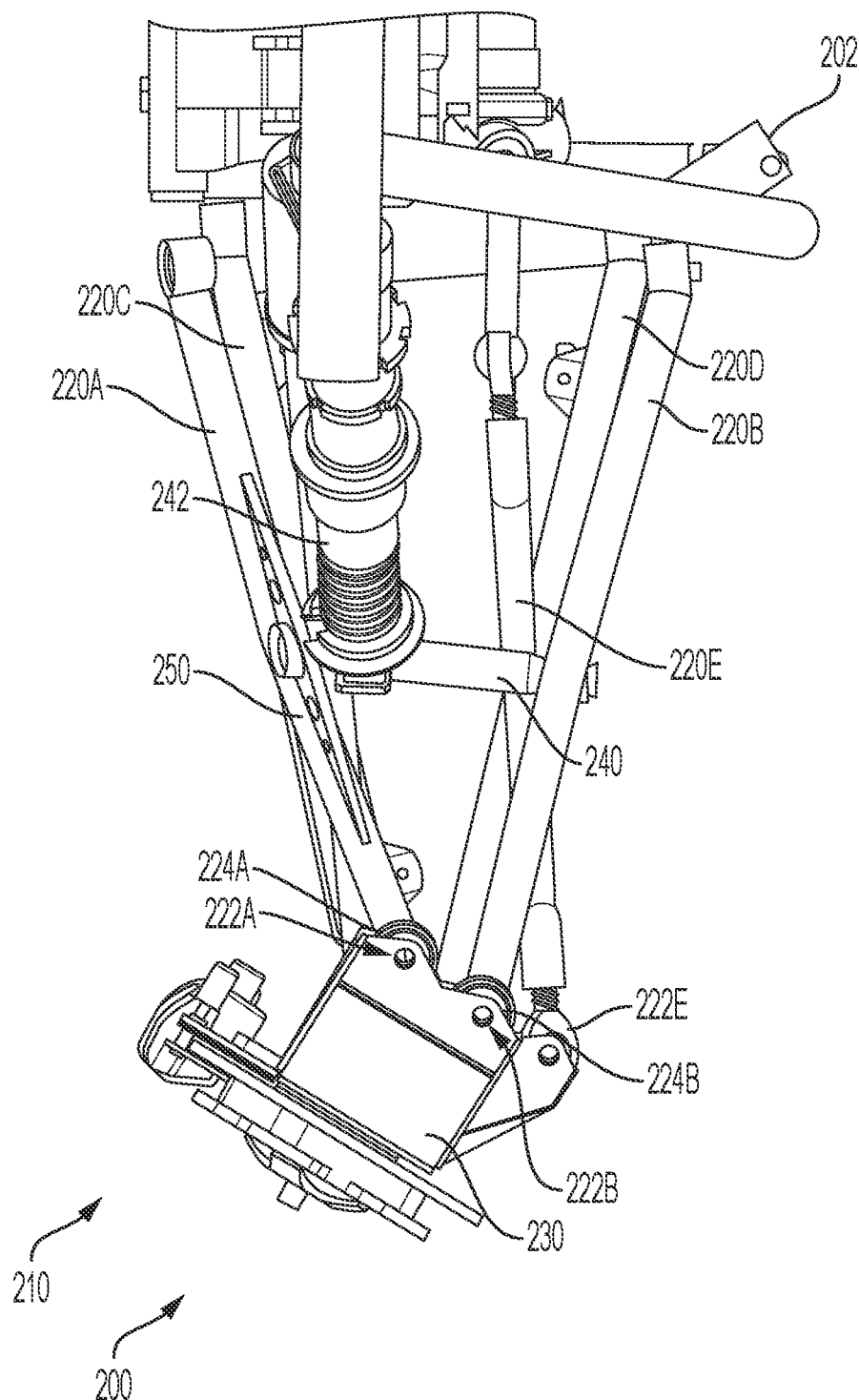

FIGS. 8-10 illustrates another embodiment of a suspension system 210 for a vehicle 200 having a chassis 202. Contemplated vehicles include, for example, all-terrain vehicles, automobiles, trucks, or any other vehicles that requires an accurate level of control and function.

The suspension system 210 comprises a first linkage arm 220A that couples to a first point 222A on an upper portion of a wheel mount 230 at a first end and a chassis of the vehicle 200 at a second end. The suspension system 210 also comprises a second linkage arm 220B that couples to a second point 222B on the upper portion of the wheel mount 230 at a first end independent of the first linkage arm 220A, and that couples to the chassis of the vehicle 200 at a second end independent of the first linkage arm 220A. As shown, the first point 222A and the second point 222B are distinct from one another.

The suspension system 210 further comprises a third linkage arm 220C and a fourth linkage arm 220D. The third linkage arm 220C couples to a third point 222C on a lower portion of the wheel mount 230 at a first end and the chassis of the vehicle 200 at a second end. The fourth linkage arm 220D couples to a fourth point 222D on the lower portion of the wheel mount 230 at a first end and the chassis of the vehicle 200 at a second end. As shown, the first point 222A, the second point 222B, the third point 222C and the fourth point 222D are distinct from one another, unlike the V-type suspension systems of the prior art where two or more linkage arms connect to the wheel mount at a single point.

Preferably, each of the linkage arms 220A-220D couple to the wheel mount via a spherical ball joint. The first end of the first linkage arm 220A couples to the first point 222A on the upper portion of the wheel mount 230 via a first spherical ball joint 224A. The first end of the second linkage arm 220B couples to the second point 222B on the upper portion of the wheel mount 230 via a second spherical ball joint 224B. The first end of the third linkage arm 220C couples to the third point 222C on the lower portion of the wheel mount 230 via a third spherical ball joint 224C, and the first end of the fourth linkage arm 220D couples to the fourth point 222D on the lower portion of a wheel mount 230 via a fourth spherical ball joint 224D.

Each of the linkage arms 220A-220D is preferably secured to its respective spherical ball joint 224A-224D via one or more bolts or other commercially suitable fasteners.

It is especially preferred that at least two of the linkage arms are secured to their respective spherical ball joint via two fasteners, where each fastener is disposed on an opposite side of the spherical ball joint.

Thus, for example, in some embodiments, the first spherical ball joint 224A and the first end of the first linkage arm 220A can be secured to one another via first and second fasteners, with the first and second fasteners disposed on opposite sides of the first spherical ball joint 224A. Similarly, the second spherical ball joint 224B and the first end of the second linkage arm 220B are secured to one another via third and fourth fasteners, with the third and fourth fasteners disposed on opposite sides of the second spherical ball joint 224B.

In other embodiments, it is contemplated that the third spherical ball joint 224C and the first end of the third linkage arm 220C are secured to one another via fifth and sixth fasteners, with the fifth and sixth fasteners disposed on opposite sides of the third spherical ball joint 224C, and the fourth spherical ball joint 224D and the first end of the fourth linkage arm 220D are secured to one another via seventh and eighth fasteners, with the seventh and eighth fasteners disposed on opposite sides of the fourth spherical ball joint 224D.

As can be seen from FIGS. 8-10, the first linkage arm 220A and the third linkage arm 220C connects a front portion of the wheel mount 230 to the chassis of the vehicle 200. The second linkage arm 220B and the fourth linkage arm 220D connects a rear portion of the wheel mount 230 to the chassis of the vehicle 200. Each of the first, second, third and fourth linkage arms 220A-220D are connected to the wheel mount 230 independent of one another and move and pivot independently of one another. In addition, each of the first, second, third and fourth linkage arms comprises a load-bearing arm to allow forces encountered by the wheel and wheel mount to be spread among the linkage arms.

A suspension linkage arm 240 is preferably connected to and disposed between two of the linkage arms, here the first linkage arm 220A and the second linkage arm 220B. Although shown disposed between the first linkage arm 220A and the second linkage arm 220B, it is contemplated that the suspension linkage arm 240 could alternatively be disposed between the third linkage arm 220C and the second linkage arm 220D, such as shown in FIGS. 1-4.

Each of the first linkage arm 220A and the second linkage arm 220B preferably comprises a gusset 250 having an aperture configured to receive a bolt or other commercially suitable fastener. While FIGS. 8-10 show the gusset 250 mounted to an upper portion of the first linkage arm 220A and a lower portion of the second linkage arm 220B, in alternative embodiments, it is contemplated that the gusset could be mounted to (i) a lower portion of the first linkage arm 220A and an upper portion of the second linkage arm 220B, (ii) a lower portion of both of the first linkage arm 220A and the second linkage arm 220B, or (iii) an upper portion of both of the first linkage arm 220A and the second linkage arm 220B.

The aperture is surrounded by a set of ball bearings, such as described above. Each end of the suspension linkage arm 240 abuts one of the apertures. The first linkage arm 220A and the second linkage arm 220B are preferably connected with a bolt, which extends through each of the holes of the gusset 250, the suspension linkage arm 240 and shock assembly 242.

Shock assembly 242 is connected at a first end to the suspension linkage arm 240. Preferably, the suspension linkage arm 240 is configured to increase or decrease its length in response to a movement of one or both of the first linkage arm 220A and the second linkage arm 220B. In this manner, it is contemplated that the suspension linkage arm 240 could comprise telescoping cylinders or have another configuration permitting it to vary in length in response to movement of one or both of the linkage arms.

As discussed above, by mounting the shock assembly 242 on the suspension linkage arm 240, the suspension linkage arm 240 can distribute forces absorbed through the shock assembly through the two linkage arms 220A, 220B for strength, while not interrupting the balanced state between negative and positive pressure among the linkage arms, which is required in order to eliminate the feedback to the handlebar or steering wheel.

As can be seen in FIGS. 8-10, the suspension linkage arm 240 is preferably mounted to each of the first linkage arm 220A and the second linkage arm 220B, such that the suspension linkage arm 240 is non-orthogonal or off-normal relative to each of the first linkage arm 220A and the second linkage arm 220B. In other words, the angle as measured between the suspension linkage arm 240 and either of the first linkage arm 220A and the second linkage arm 220B is not equal to ninety degrees.

It is further contemplated that a first plane can vertically bisect each of the first, second, third and fourth points 222A-222D where each of the first, second, third and fourth linkage arms 220A-220D couple to the wheel mount 230, respectively. A second plane can vertically bisect the shock assembly 242. Preferably, the second plane is not parallel to the first plane.

To allow steering of the vehicle 200, the suspension system 210 comprises a fifth linkage arm 220E that couples to a fifth point 222E of the wheel mount 230 at a first end and the steering rack 262 of the vehicle 200 at a second end.

With respect to the remaining numerals in each of FIGS. 8-10, the same considerations for like components with like numerals of FIGS. 1-4 apply.

FIG. 11 illustrates an embodiment of a suspension system in which a first plane 360 can intersect the point where the axis of each of the first and second linkage arms 320A-320B meet and the point where the axis of each of the third and fourth linkage arms 320C-320D meet, preferably at or near a center line of the wheel mount 330. A second plane 362 can vertically bisect the shock assembly 342. Preferably, the second plane 362 is not parallel to the first plane 360.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A suspension system for a vehicle, comprising:
   a first linkage that couples to a first point on a portion of a wheel mount at a first end and a chassis of the vehicle at a second end;
   a second linkage that couples to a second point on the portion of the wheel mount at a first end independent of the first linkage, and that couples to the chassis of the vehicle at a second end independent of the first linkage, wherein the first and second points are distinct from one another;
   wherein the first end of the first linkage couples to the first point on the portion of the wheel mount via a first spherical ball joint; and
   wherein the first end of the second linkage couples to the second point on the portion of the wheel mount via a second spherical ball joint;
   a suspension linkage having a first end and a second end, wherein the first end of the suspension linkage is connected to the first linkage and the second end of the suspension linkage is connected to the second linkage, such that the suspension linkage is disposed between the first and second linkages and the first end of the suspension linkage can move relative to the second end of the suspension linkage;
   a shock assembly having a first end and a second end, wherein the first end of the shock assembly is connected to the suspension linkage.

2. The suspension system of claim 1, wherein the first linkage connects a front portion of the wheel mount to the chassis of the vehicle, and the second linkage connects a rear portion of the wheel mount to the chassis of the vehicle.

3. The suspension system of claim 1, wherein the first linkage pivots or moves independently of the second linkage.

4. The suspension system of claim 1, further comprising:
   a third linkage that couples to a third point on a different portion of the wheel mount at a first end of the third linkage and the chassis of the vehicle at a second end of the third linkage;
   a fourth linkage that couples to a fourth point on the different portion of the wheel mount at a first end of the fourth linkage and the chassis of the vehicle at a second end of the fourth linkage, wherein the first, second, third and fourth points are distinct from one another;
   wherein the first end of the third linkage couples to the third point of the wheel mount via a third spherical ball joint; and
   wherein the first end of the fourth linkage couples to the fourth point of the wheel mount via a fourth spherical ball joint.

5. The suspension system of claim 4, wherein each of the first, second, third and fourth linkage are connected to the wheel mount independent of one another.

6. The suspension system of claim 4, wherein the first and third linkages connect a front portion of the wheel mount to the chassis of the vehicle, and the second and fourth linkages connect a rear portion of the wheel mount to the chassis of the vehicle.

7. The suspension system of claim 1, wherein the suspension linkage is mounted to an upper or lower surface of each of the first and second linkages.

8. The suspension system of claim 1, wherein the suspension linkage is mounted to each of the first and second linkages such that the suspension linkage is non-orthogonal relative to each of the first and second linkages.

9. The suspension system of claim 4, wherein each of the first, second, third and fourth linkages comprises a load-bearing arm.

10. The suspension system of claim 4, wherein each of the first, second, third and fourth linkages move and pivot independently of one another.

11. The suspension system of claim 4, further comprising:
a fifth linkage that couples to a fifth point of the wheel mount at a first end of the fifth linkage and a steering rack of the vehicle at a second end of the fifth linkage.

12. The suspension system of claim 11, further comprising:
a wheel mounted on the wheel mount;
wherein the first, second, third, fourth and fifth linkages pivot or move independently from one another, such that a force applied to the wheel imparts a minimum force to the steering rack.

13. The suspension system of claim 1, wherein the first and second linkage couple to an upper portion of the wheel mount.

14. The suspension system of claim 1, wherein the first and second linkages couple to a lower portion of the wheel mount.

15. The suspension system of claim 1, wherein a first end of the suspension linkage abuts an aperture on a gusset coupled to one of the first or second linkages, wherein the aperture is surrounded by a set of ball bearings.

16. A suspension system for a vehicle, comprising:
a first linkage that couples to a first point on a portion of a wheel mount at a first end and a chassis of the vehicle at a second end;
a second linkage that couples at a first end to a second point on the portion of the wheel mount independent of the first linkage, and that couples to the chassis of the vehicle at a second end independent of the first linkage, wherein the first and second points are distinct from one another;
wherein the first end of the first linkage couples to the first point on the portion of the wheel mount via a first spherical ball joint;
wherein the first end of the second linkage couples to the second point on the portion of the wheel mount via a second spherical ball joint;
a suspension linkage connected to each of the first and second linkages and being disposed between the first and second linkages, wherein the suspension linkage is configured to vary in length based on a movement of the set of linkages; and
a shock assembly having a first end and a second end, wherein the first end of the shock assembly is connected to the suspension linkage.

17. A suspension system for a vehicle, comprising:
a first linkage that couples to a first point on a first portion of a wheel mount at a first end of the first linkage and a chassis of the vehicle at a second end of the first linkage;
a second linkage that couples to a second point on the first portion of the wheel mount at a first end of the second linkage and the chassis of the vehicle at a second end of the second linkage;
a third linkage that couples to a third point on a second portion of the wheel mount at a first end of the third linkage and the chassis of the vehicle at a second end of the third linkage;
a suspension linkage connecting the first and second linkages and disposed between the first and second linkages, wherein a first end of the suspension linkage abuts an aperture on a gusset coupled to one of the first and second linkages, wherein the aperture is surrounded by a set of ball bearings;
a shock assembly connected at a first end to the suspension linkage, wherein the first portion comprises an upper or lower portion of the wheel mount, and the second portion comprises the other of the upper or lower portion of the wheel mount.

18. The suspension system of claim 17, wherein the suspension linkage is mounted to a top or bottom surface of each of the first and second linkages such that the suspension linkage is non-orthogonal relative to each of the first and second linkages.

19. The suspension system of claim 17, wherein a first plane intersects each of the first, second and third points where each of the first, second, and third linkages couple to the wheel mount, respectively, and wherein the shock assembly is mounted to the suspension linkage such that a second plane bisecting the shock assembly is non-parallel to the first plane.

20. The suspension system of claim 17, wherein the first, second and third linkages are mounted to the wheel mount such that each of the first, second and third linkages can pivot or move independently of one another.

21. The suspension system of claim 17, wherein the first end of the first linkage couples to the first point on the first portion of the wheel mount via a first spherical ball joint, wherein the first end of the second linkage couples to the second point on the first portion of the wheel mount via a second spherical ball joint, and wherein the first end of the third linkage couples to the third point on the second portion of the wheel mount via a third spherical ball joint.

22. A suspension system for a vehicle, comprising:
a first linkage that couples to a first point of a wheel mount at a first end and a chassis of the vehicle at a second end;
a second linkage that couples to a second point of the wheel mount at a first end independent of the first linkage, and that couples to the chassis of the vehicle at a second end independent of the first linkage, wherein the first and second points are distinct from one another;
wherein the first end of the first linkage couples to the first point of the wheel mount via a first spherical ball joint, and wherein the first spherical ball joint and first end of the first linkage are secured to one another via a first fastener;
wherein the first end of the second linkage couples to the second point of the wheel mount via a second spherical ball joint, and wherein the second spherical ball joint and first end of the second linkage are secured to one another via a second fastener;
a suspension linkage mounted to each of the first and second linkages and being disposed between the first and second linkages, wherein the suspension linkage is configured to vary its length based on a movement of the first or second linkage; and
a shock assembly having a first end that is connected to the suspension linkage.

* * * * *